Jan. 6, 1959     F. E. NELSON     2,867,339
LOAD CARRYING VEHICLES AND BODIES THEREFOR
Filed Aug. 17, 1956     8 Sheets-Sheet 1

INVENTOR.
Floyd Nelson.
BY
ATTORNEYS.

Jan. 6, 1959 F. E. NELSON 2,867,339
LOAD CARRYING VEHICLES AND BODIES THEREFOR
Filed Aug. 17, 1956 8 Sheets-Sheet 2

INVENTOR.
Floyd Nelson.
BY
Fishburn & Gold
ATTORNEYS.

Jan. 6, 1959　　　　　F. E. NELSON　　　　　2,867,339
LOAD CARRYING VEHICLES AND BODIES THEREFOR
Filed Aug. 17, 1956　　　　　　　　　　　　　　8 Sheets-Sheet 4

*Fig. 4.*

INVENTOR.
Floyd Nelson.
ATTORNEYS.

Jan. 6, 1959  F. E. NELSON  2,867,339
LOAD CARRYING VEHICLES AND BODIES THEREFOR
Filed Aug. 17, 1956  8 Sheets-Sheet 7

INVENTOR.
Floyd Nelson.
BY
ATTORNEYS.

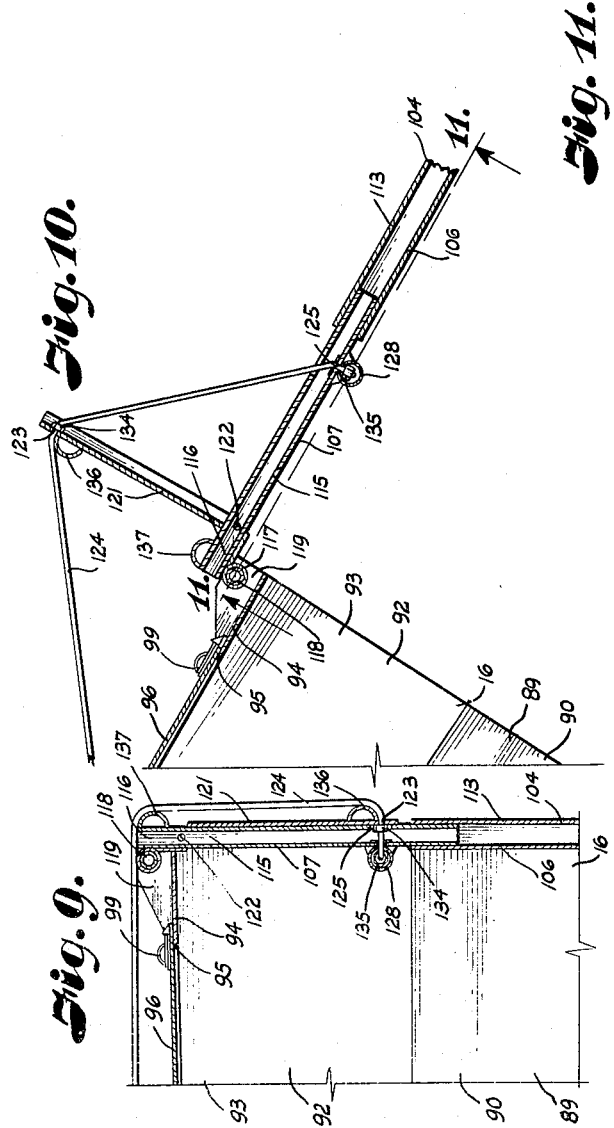

United States Patent Office 2,867,339
Patented Jan. 6, 1959

2,867,339

LOAD CARRYING VEHICLES AND BODIES THEREFOR

Floyd E. Nelson, Kansas City, Kans.

Application August 17, 1956, Serial No. 604,700

9 Claims. (Cl. 214—517)

This invention relates to load-carrying equipment, and more particularly to trucks and removable bodies therefor which may be bodily removed, left for loading and later loaded on the chassis, hauled to a destination and bodily unloaded or the contents dumped as desired.

There have been various attempts made to provide load-carrying equipment such as trucks with devices for bodily loading load-carrying bodies on the chassis and then removing the body from the chassis to leave same for loading and unloading material therein. Generally, these attempts have been characterized by complicated operations, difficulties of handling some loads, as well as the excessive cost of purchase, maintenance and use.

The principal objects of the present invention are to obviate the disadvantages of prior art structures and to provide load-carrying equipment such as trucks with removable bodies therefor which may be bodily removed or held on the chassis and tilted for unloading; to provide a truck chassis with a body-tilting structure for gravity unloading of the body from the chassis; to provide a truck chassis with power means for raising a body from the ground and drawing said body onto the truck chassis and lock means for retaining the body thereon; to provide controls for the lock means for selective retaining or releasing the body relative to the chassis when in tilted position; to provide the chassis and body with a rear door and automatic opening means therefor operable in response to tilting of the body; to provide a load-carrying apparatus and body therefor that includes a plurality of separable sections for selective use; and to provide a load-carrying vehicle and body therefor that permits the loading of bodies while the chassis is hauling other bodies, that is easily operated to load the bodies on the chassis and that facilitates the unloading of the body and/or contents thereof.

In accomplishing these and other objects of the present invention, I have provided improved details of structure, the preferred form of which is illustrated in the accompanying drawings, wherein:

Fig. 4 is a perspective view of a body or container tilted on a truck chassis for dumping of the contents from said container.

Fig. 8 is a partial rear elevation of the chassis and body.

Fig. 9 is a fragmentary longitudinal sectional view through the rear portion of the body and rear door thereon in closed position.

Fig. 10 is a fragmentary longitudinal sectional view through the rear end of the body with the door in partially opened position.

Fig. 11 is a transverse sectional view through portions of the rear door on the line 11—11, Fig. 10.

Fig. 12 is a vertical sectional view through the side walls of the body sections of the container on the line 12—12, Fig. 1.

Figure 1:
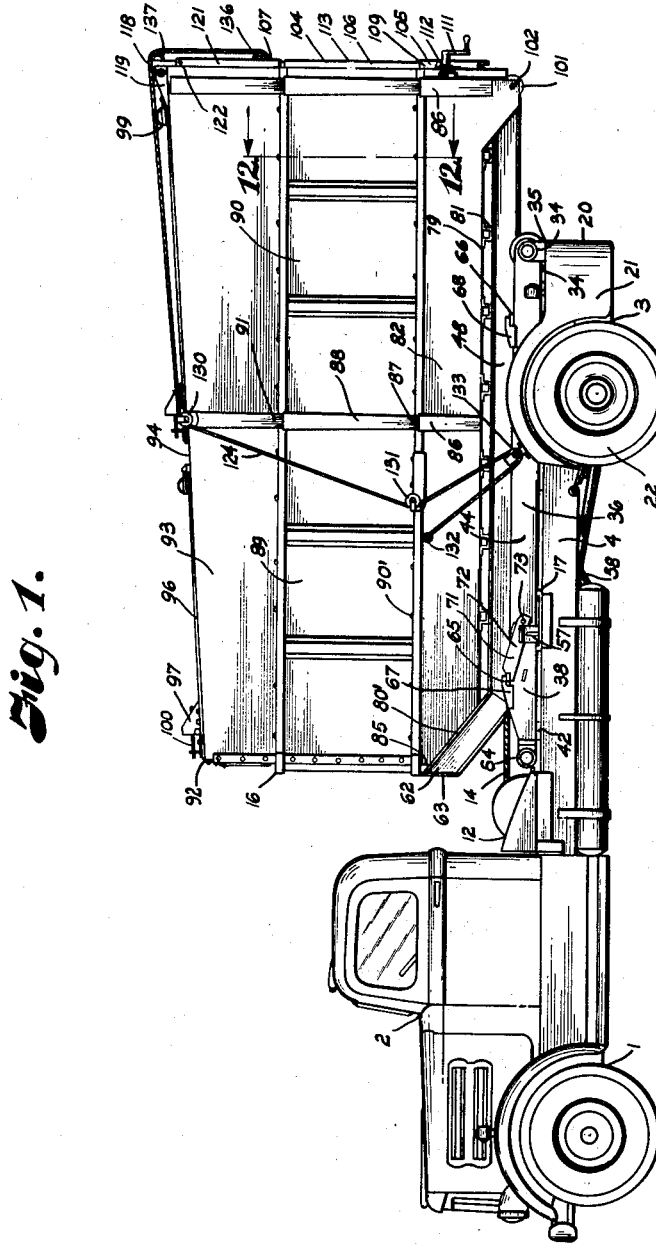
Fig. 1 is a side elevation of a truck with a body thereon for transportation in accordance with the invention.

Referring more in detail to the drawings:

1 designates a vehicle such as a truck having a cab 2 and a chassis 3 which includes spaced longitudinal frame members 4 and 5 having a plurality of suitable lateral connecting members 6, 7, 8, 9, 10 and 11 to form a rigid frame structure.

The truck chassis is provided with a power operated winch 12 fixed thereon to the rear of and adjacent the cab 2 with the axis of the winch drum 13 extending transversely of the chassis, the winch having a cable 14 on the drum thereof with the ends of the cable terminating in a hook 15 or other suitable rope fitting for connection with a load-carrying body 16 adapted to be carried on the chassis as later described.

Figure 6:
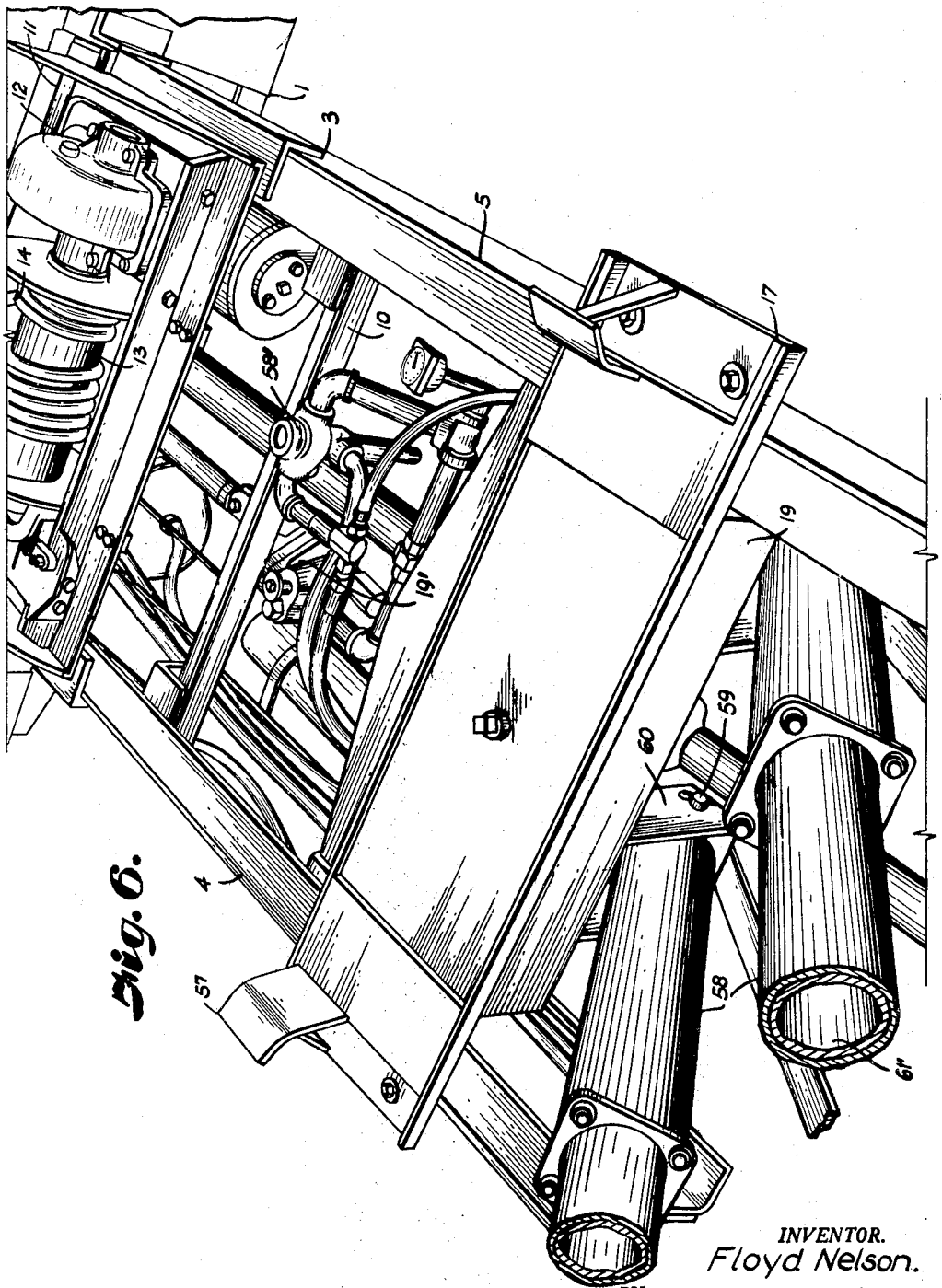
Fig. 6 is an enlarged partial perspective view of the forward portion of the truck chassis with the tilting frame removed therefrom.

A heavy relatively wide plate 17 extends transversely with end portions resting on the frame members 4 and 5 intermediate the winch 12 and the rear axle 18 of the chassis. The plate member is suitably secured to the frame members 4 and 5 and forms the top wall of a tank 19 depending therefrom between the frame members 4 and 5, said tank forming a reservoir for hydraulic fluid of an hydraulic system which includes a pump 19' (Fig. 6) and controls (not shown) for supplying fluid pressure to hydraulic actuated devices on the chassis as later described.

The transverse member 6 is preferably at the rear ends of the frame members 4 and 5 and secured to the rear face thereof and depending therefrom is a butt plate 20 of heavy metal plate forming a bumper at the rear of the chassis frame. In the illustrated structure, the plate 20 extends across the rear of the chassis and has its side edges turned forwardly and connected with the outer side members of fenders 21 over the rear wheels 22, the sides of the fenders being suitably spaced laterally outwardly from the tires on the wheels.

It is preferable that the rear end of the chassis frame have a load-supporting ground-engaging jack or stiff leg 23 to partially support any heavy concentrated loads at the rear end of the chassis during loading and unloading, said jack or stiff leg 23 preferably consisting of a U-shaped member having a ground-engaging foot 24 and upwardly extending legs 25 pivotally mounted as at 26 on legs 27 fixed to and depending from the rear portion of the frame members adjacent to and forwardly of the plate 20. A spring 28 has its ends connected to the chassis frame and leg 23 respectively whereby the tension of the spring tends to swing the jack or leg 23 upwardly and forwardly to provide suitable clearance during traveling of the vehicle. The jack or leg is swung into load-supporting position by means of an extensible member 29 preferably having a cylinder 30 with one end pivotally mounted as at 31 on the transverse member 7 and the other end having a piston rod 32 extending from the cylinder and pivotally connected as at 33 to the jack or leg 23 whereby extension of the extensible means swings the leg downwardly and rearwardly on the pivot means 26 to the position shown in Fig. 7.

The rear end of the chassis frame preferably has a transverse plate 34 resting on and suitably secured to the upper faces of the frame members 4 and 5 and extending outwardly laterally from the frame members and suitably connected with the fenders 21 to form rearward extensions thereof, the rear edge 35 of the plate 34 preferably coinciding substantially with the rear surface of the plate member 20. The rear member 6 preferably extends outwardly laterally from the frame members 4 and 5 under the plate 34 to provide support for the lateral extremities thereof.

A rigid tilting frame 36 has its rear end portion suitably supported in spaced bearings 37 fixed on the plate 34 and spaced laterally outwardly from the outer sides of the frame members 4 and 5 whereby the tilting frame 36 is suitably supported for vertical swinging movement. The tilting frame 36 has spaced longitudinal members 38 and 39 provided with suitable transverse members 40, 41 and 42 and other suitable bracing such as an X-member 43 to provide a rigid tilting frame structure. In the illustrated structure, the side frame members of the tilting frame are formed of structural members such as angle iron with one flange 44 of each arranged substantially in a vertical plane and the other flange 45 of each extending inwardly from the lower edge of the vertical flange with the flanges 45 preferably substantially overlying the frame members 4 and 5 of the chassis. Spaced bearing members 46 are mounted on the side frame members 38 and 39 and preferably resting on the flanges 45 thereof to cooperate with the flanges 44 in supporting a plurality of rollers 47 spaced longitudinally along the tilting frame which cooperate with the flanges 44 in defining a pair of tracks which are adapted to receive a pair of spaced skids 48 which are rigidly secured to the bottom of the truck body or container 16 or other load-carrying device adapted to be transported on the vehicle. The rear ends of the flanges 44 are preferably fixed to a transverse shaft 49 that has lateral end portions pivotally mounted in the bearing members 37 for the pivotal mounting of the tilting frame 36. One or more rollers 50 are sleeved on the shaft 49 between the flanges 44 and is provided with guide flanges 51 adjacent the ends thereof with the inner surfaces of said flanges spaced slightly more than the distance between the outer surfaces of the skids 48 whereby said flanges 51 aid in guiding the load-carrying body when it is being loaded and unloaded from the vehicle. The roller 50 also preferably has spaced flanges 52 substantially midway the length thereof to define a cable groove 53 for receiving the cable 14 as later described. The periphery of the roller 50 between the flanges is such that the rear surface of the plate 20 is substantially tangentially thereof and the upper surface is substantially in line with the upper surface of the rollers 47 which are spaced below the upper edges of the flanges 44.

A roller 54 is rotatably mounted on a transverse shaft 55 forwardly of the transverse member 42 at the forward end of the tilting frame 36. The shaft 55 is preferably suitably secured to extensions 56 extending forwardly from the member 42 and suitably spaced whereby the roller 54 is at least as long as the winch drum which is preferably midway between the frame members 4 and 5 whereby cable being payed from the winch drum will be guided by and run over the roller 54. The tilting frame 36 is of a length relative to the length of the chassis so that the roller is positioned close to the transverse member 42 at the forward end of the tilting frame and when in lowered position onto the chassis frame the forward end of the roller 54 is close to the winch 12. When the tilting frame is in lowered position, a portion at the rear thereof, for example, the transverse member 40, preferably rests on the plate 34 and the transverse member 42 rests on the side frame members 4 and 5. The intermediate portion of the tilting frame rests on the transverse plate 17 to provide contacting support between the chassis and tilting frame when in load-carrying position. The plate 17 preferably has upstanding guides 57 terminating in outwardly inclined portions adapted to engage the outer surface of the flanges 44 of the side frame members 38 and 39 as the tilting frame is lowered and guide same into position and then prevent lateral movement by the forward end of the tilting frame relative to the chassis frame.

The tilting frame is preferably swung vertically by means of extensible members 58 having one end pivotally connected as at 59 to a supporting structure 60 carried on the chassis frame and the other end pivotally connected as at 61 to the tilting frame intermediate its end. The size and number of extensible means would, of course, vary with the load to be carried. In the illustrated structure, there are two telescoping type hydraulic jacks laterally spaced on the chassis frame of the upper or piston portion 61' pivotally connected as at 61 to the transverse member 41 of the tilting frame. The extensible means 58 is such that hydraulic fluid under pressure is applied to the lower end thereof to effect extension and upward swinging of the tilting frame 36 about the axis of the shaft 49. When it is desired to lower the tilting frame, the hydraulic controls (not shown) are manipulated whereby the fluid in the cylinder of the extensible members is forced to the supply tank 19 as the extensible members are contracted by the weight of the tilting frame 36 to effect downward swinging movement of said tilting frame. It is obvious a two-way hydraulic system may be used whereby the cylinder and piston will pull the tilting frame down, if desired. However, it is preferred to use the cable 14 and winch 12 to pull the tilting frame down if necessary. When the tilting frame rests on the chassis frame, the connection of the cable 14 to the body and/or tilting frame retains the tilting frame on the chassis frame in load-carrying position. An adjustable differential relief valve 58' is preferably arranged in the hydraulic system of the extensible member 58 to prevent excessive forces being applied to either of the chassis frame or tilting frame.

The skids 48 which are fixed to the body or container 16 are preferably formed of structural members such as I-beams or the like with an upwardly inclined portion 62 at their forward ends and which are connected by a transverse vertical plate 63 at the forward ends of the inclined portion 62. The skids are also connected by a transverse member 64 adjacent the rear of the inclined portion 62 and may have additional transverse members to cooperate with the body in forming a rigid support structure therefor. Each of the skids 48 have a plurality of laterally outwardly extending lugs 65 and 66 thereon adapted when the skids and body thereon are mounted on the tilting frame of the load-carrying apparatus to engage hook-shaped stop members 67 and 68 respectively which are fixed to the flanges 44 of the tilting frame side members 38 and 39. The latch members are of plate-like structure each having a rearwardly and upwardly sloping upper edge 69 and terminating at their rear ends in a rearwardly extending finger 70 spaced above the upper edge of the flanges 44 to cooperate therewith to form recesses in which the lugs 65 and 66 enter whereby the fingers hold the skids down on the tilting frame and particularly the rollers 47 thereon. When the body-carrying skids are mounted on the tilting frame in load-carrying position, the stop members limit forward movement of the skids and latch members 71 are operable to limit rearward movement. The latch members 71 consist of arms 72 mounted on the outside of the flanges 44 with one end fixed on a shaft 73 that extends through the flanges to pivotally mount said arms whereby the arms may be swung up to engage the rear of the lugs 65 or swung downwardly to disengage said lugs. In the illustrated structure, the shafts 73 extend through the forward set of rollers 47 to form the rotatable mounting thereof with the inner ends of said shafts fixed to arms 74 that are connected by rods 74' to diaphragm type air operated members 75 which are similar to air brake actuators used on conventional truck equipment, the actuators 75 being supported on brackets 76 carried on the frame members 38 and 39 whereby when air is applied to the actuators the latch arms 72 are swung upwardly and when the air pressure is released from the actuators the latch arms are swung by gravity into released position. The transverse member 64 is preferably provided with forwardly extending ears 77 having a pin 78 carried thereby adapted to be engaged by the hook 15 on the cable 14 whereby the winch 12 is usable for controlling movement of the body and skids.

The body or container 16 may be of any suitable structure, for example, it may be a platform carried by the skids 48, open topped dump bodies or various structures of closed containers. In the illustrated structure, the body 16 consists of a bottom section 79 having a bottom 80 provided with a plurality of spaced transverse members 81 on the lower side thereof adapted to rest on the upper surface of the skids 48 and be suitably secured thereto. The forward end of the bottom wall 80 has an upturned portion 80' resting on and fixed to the upper surface of the inclined portion 62 of the skids. The body has side walls 82 extending upwardly from the side edges of the bottom wall 80 which preferably terminated in outwardly and downwardly turned flanges 83 and 84 to form an upper rim thereon. A front wall 85 extends upwardly from the forward end of the inclined bottom portion 80', said front wall also having outwardly and downwardly turned flange portions similar to the flanges 83 and 84. The side walls also are provided with outwardly extending vertically arranged tubular members 86 forming stake pockets with open upper ends adapted to receive the lower downwardly extending ends 87 of stakes 88 carried on the sides of a removable intermediate body section 89 having side wall and front wall panels 90 whereby the heighth of the body may be increased when desired. The lower edge of the side and front wall panels 90 are turned outwardly and downwardly to engage the flanges 83 and 84 and are preferably secured thereto by suitable fastening devices 90'. The upper edges of the panels 90 are turned outwardly and downwardly forming flanges corresponding in size and shape to the flanges 83 and 84 and the upper ends of the stake 88 are hollow to receive the lower ends of the stakes 91 on an upper body section 92. The upper body section has side and front walls 93, the lower edges of which are turned outwardly and downwardly to seat on the upper edges of the panels 90 or the upper edges of the side and front walls 82 and 85 of the lower body section. In the illustrated structure, the upper section 92 has a top wall 94 provided with openings 95 normally closed by hinged doors 96 pivotally mounted on suitable hinge brackets 97 by hinge shafts 98. Latches 99 are arranged to hold the doors 96 in closed position, and when the latch is released springs 100 sleeved on the shafts 98 and engaged with the door and body swing the doors upwardly into open position for loading of the body from the top thereof. It is to be understood that with the body structure illustrated and described, a low side wall open top body may be used, a higher side wall open top body with the panels 90 thereon may be utilized, a low covered body as when the upper portion or section 92 is placed on the lower section, or a high closed top body may be used wherein the upper section 92 is mounted on the panels 90. It is preferred that with any of the various body structures, the rear lower end thereof and/or the skids 48 be provided with a transverse roller 101 rotatably mounted as at 102 whereby the lower and rear surfaces thereof extend below the bottom of the skids 48 and to the rear of the sides 82 of the lower or bottom section 79 of the body 16.

The body 16 has a rear opening 103 closed by a door 104 which is formed of a lower section 105, intermediate section 106, and upper section 107. The lower section has a wall 108, the top edge of which is turned outwardly and downwardly to form flanges similar to the flanges 83 and 84 and the lower edge also has flanges turned outwardly and downwardly to provide stiffness to the door. Adjacent the side edges of the door section 105 are tubular stake pockets 109 having open upper ends for receiving depending stakes of other door sections. When only the lower section of the body is used, the lower section 105 is manually placed in closing position and secured into the body by suitable latches 110 which in the illustrated structure are threaded members pivotally mounted on the lower body section with a crank member 111 threaded thereon and adapted to engage ears 112 on the door section 105 to clamp same to the body section. The intermediate door section 106 is preferably of the same heighth as the side walls or panels 90 and has stake members 113 on each end with depending portions adapted to extend into the hollow upper portion of the stake members 109. The upper and lower edges of the wall of the intermediate door section are bent outwardly and downwardly to engage the upper flanges on the door section 105 and be secured thereto by suitable fastening devices 114, the upper flanged portion of the intermediate door section being adapted to receive the lower flanged portion of the upper door section 107 when the top section of the body is utilized. When only the lower and intermediate sections of the body are used, the door sections 105 and 106 are secured together and removably secured to the body by the latches 110. When the top section 92 of the body is utilized, the upper door section 107 is hingedly mounted thereon and is suitably secured by suitable fastening devices to the intermediate door section 106 or the lower door section 105 in accordance with the body sections used, the sides of the upper door section 107 having stakes extending into the tubular sockets of the stake members of the other lower door section. The door section 107 has upwardly extending portions 116 of the stake members 115 with bearing members 117 thereon rotatably mounted on a shaft 118 carried by upwardly extending ears 119 on the rear upper ends of the upper body section 92 to pivotally mount the door section 107 for vertical swinging movement on said upper body section.

An automatic lift for the door 104 includes an arm 121 having one end pivotally mounted as at 122 at one side of the door adjacent the upper edge of the stake member 115. The free end of the arm has an aperture 123 extending therethrough through which a cable or other flexible member 124 extends. The cable extends through an aperture 125 in the door section 107 and has its end connected to one end 126 of a spring 127 slidable inside of an elongated tubular housing 128 secured on the inside surface of the door section 107 adjacent the lower end thereof. The other end of the spring is connected as at 129 to the end of the housing 128 remote from the aperture 125. The cable extends from the arm 121 over a pulley 130 suitably mounted adjacent the top of the upper body section 92 preferably substantially midway the length thereof and then over a pulley 131 preferably spaced slightly forwardly of the middle of the length of the lower body section and adjacent the upper edge thereof with the end of the cable secured as at 132 to said lower body section. A pulley 133 is suitably mounted on the adjacent fender or chassis frame below the pulley 131, the cable 124 having suitable length whereby the portion between the end fastened at 132 and the cable portion between the pulley 131 and the fastening at 132 is moved under the pulley 133 to provide, in effect, an anchor on the chassis frame so that when the tilting frame is raised, a stop 134 fixed to the cable and positioned to engage the arm 121 adjacent the aperture 123 when the arm is down against the door in doorway closed position pulls said arm substantially to a position at right angles to the door as illustrated in Fig. 10 during the first tilting movement of the tilting frame and body. When the arm 121 is in raised position a stop 135 engages the inside of the door adjacent the aperture 125 whereby further tilting movement causes the cable to pull the door into open position as illustrated in Fig. 4, the full swinging of the door being from 140 to 150 degrees whereby the lower end of the lower door section in open position is at a substantially higher elevation than the upper edge of the door so that the door will clear any material that is dumped from the body as the truck is moved from the dumping site. After the material is dumped from the body and the vehicle pulled from the dumping site and the tilting frame lowered to lower the body to load-carrying position, the door 104 is swung by gravity into door-closing position and in the last lowering movement of the tilting frame the arm 121 is pulled by the cable through the tension on the spring 127 into the position shown in Fig. 9. The arrangement of the arm 121 provides a leverage to facilitate lifting of the door, and to eliminate sharp bends in the cable an arcuate guide track 136 is positioned on the arm 121 adjacent the aperture 123 and another arcuate guide 137 is positioned on the upper end of the door extension above the arm 121 whereby the cable will bend over the guides 136 and 137 when in closed position as shown in Fig. 9. When it is desired to tilt the body without opening the door, as, for example, when unloading the entire body, the cable is removed from the pulley 133 and allowed to hang loose.

Figure 2:
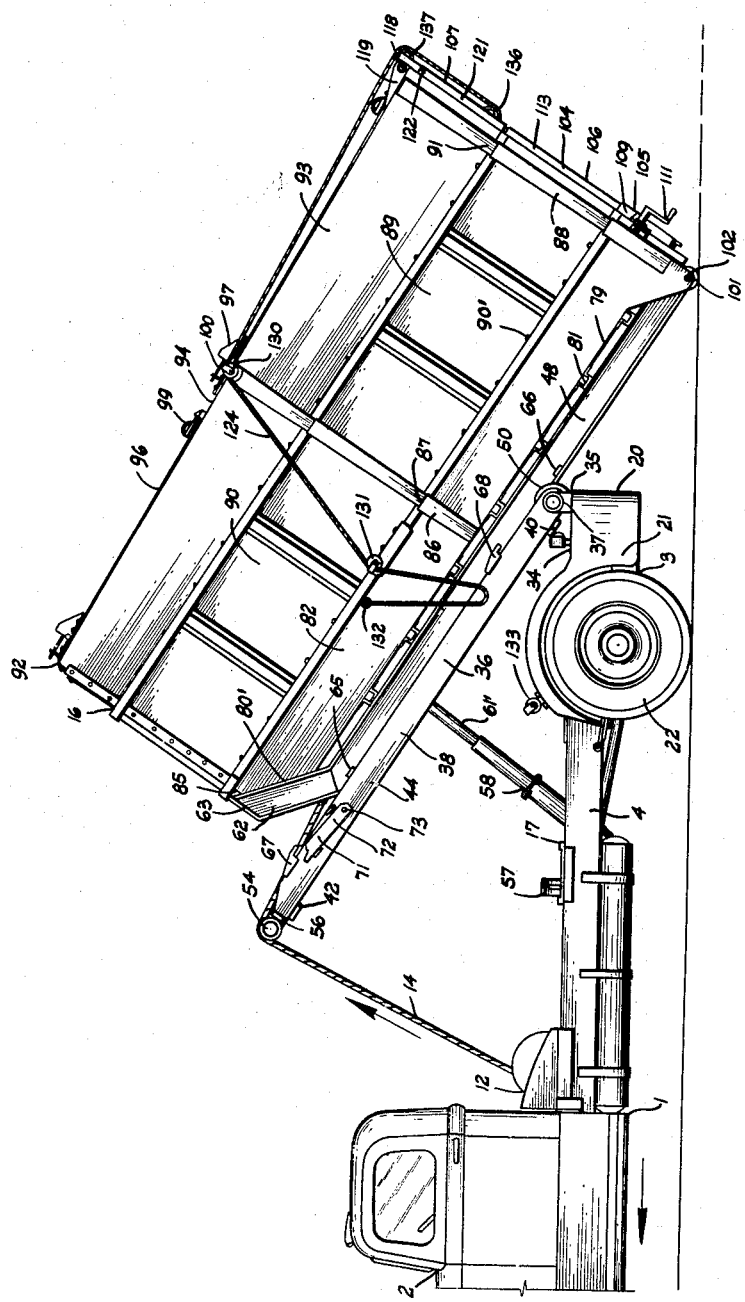
Fig. 2 is a side elevation of a body or container being unloaded from a truck chassis.
Figure 3:
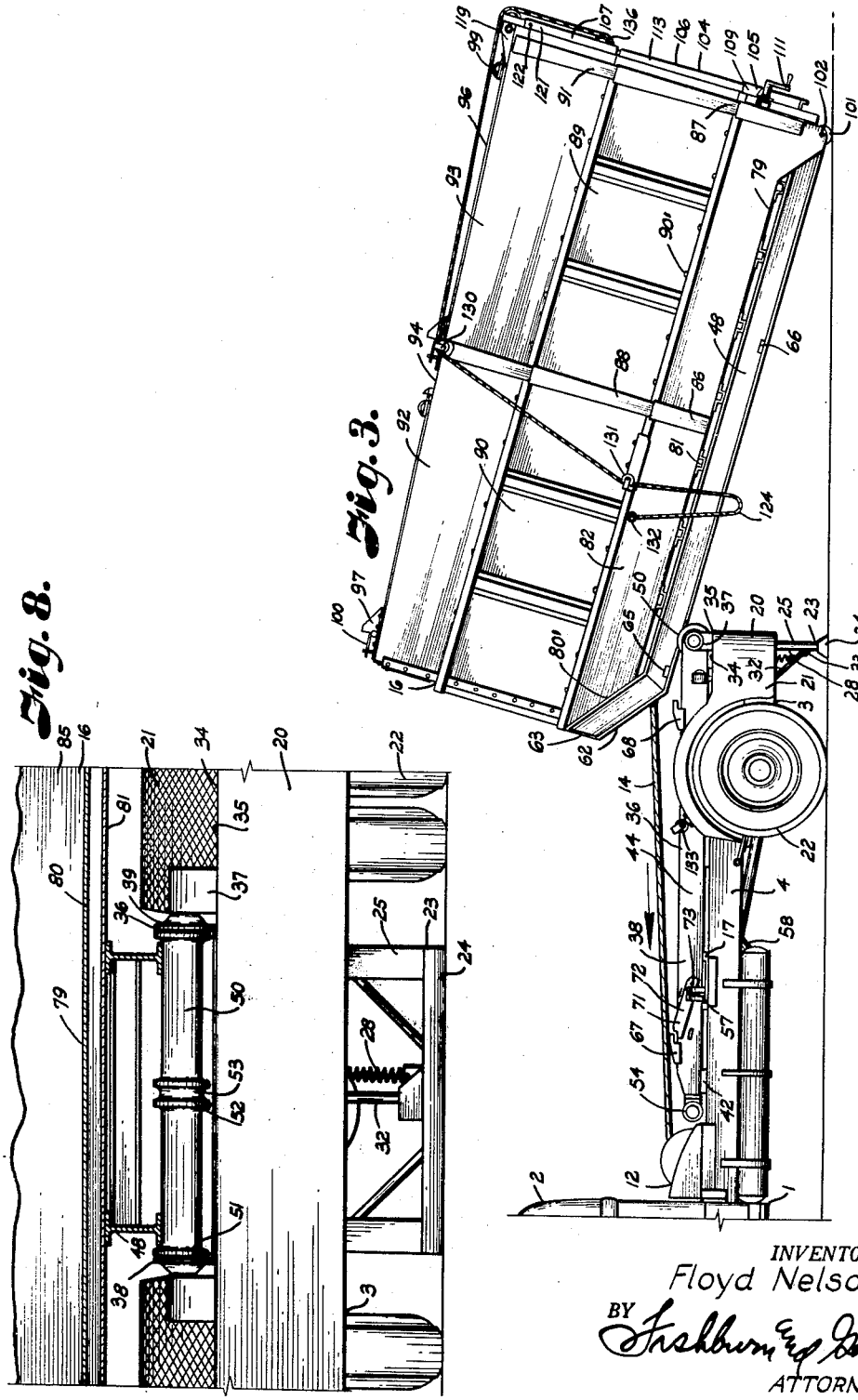
Fig. 3 is a side elevation of a body or container being loaded on a truck chassis.
Figure 5:
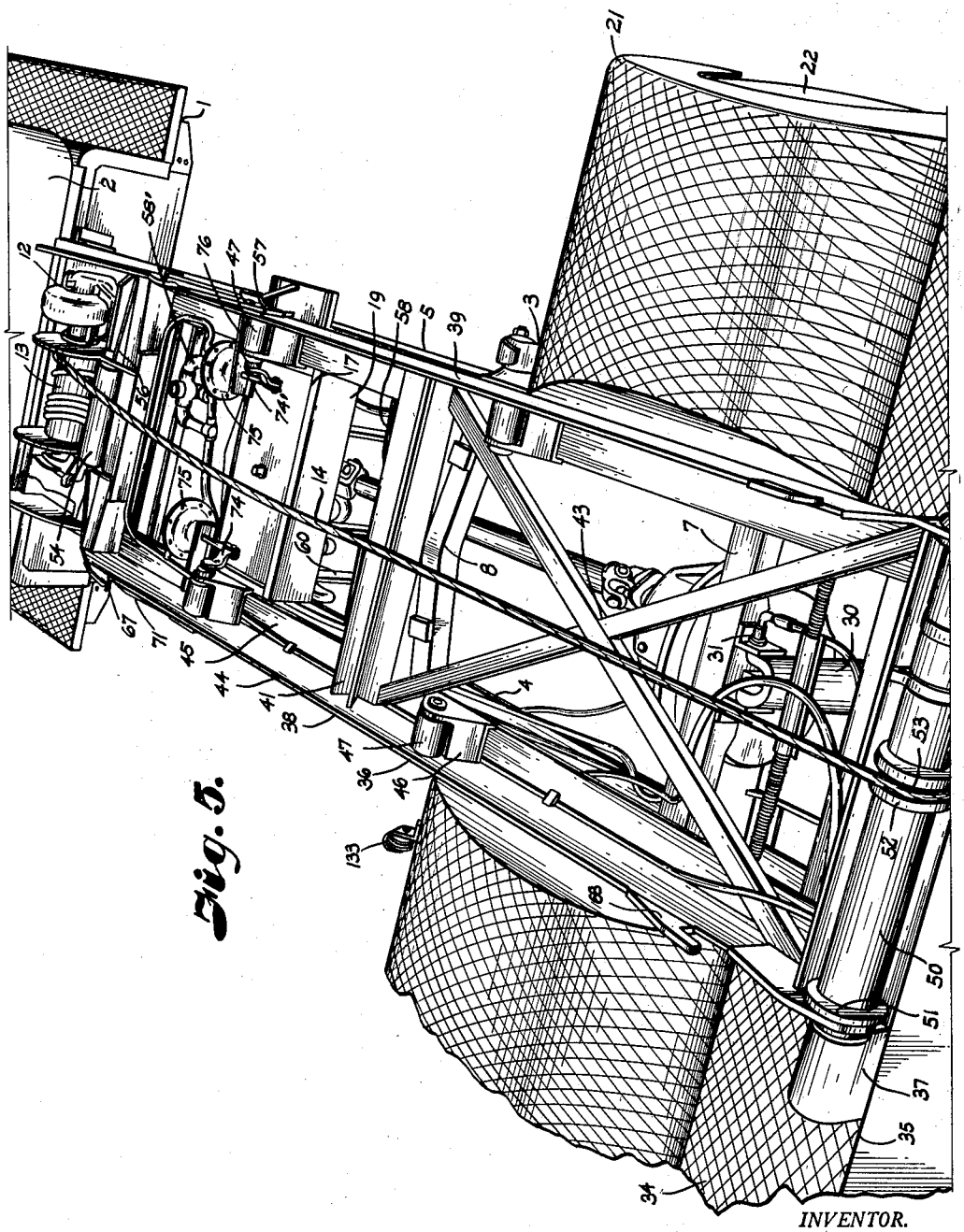
Fig. 5 is a partial perspective view of the truck chassis with the load-containing body removed therefrom.
Figure 7:
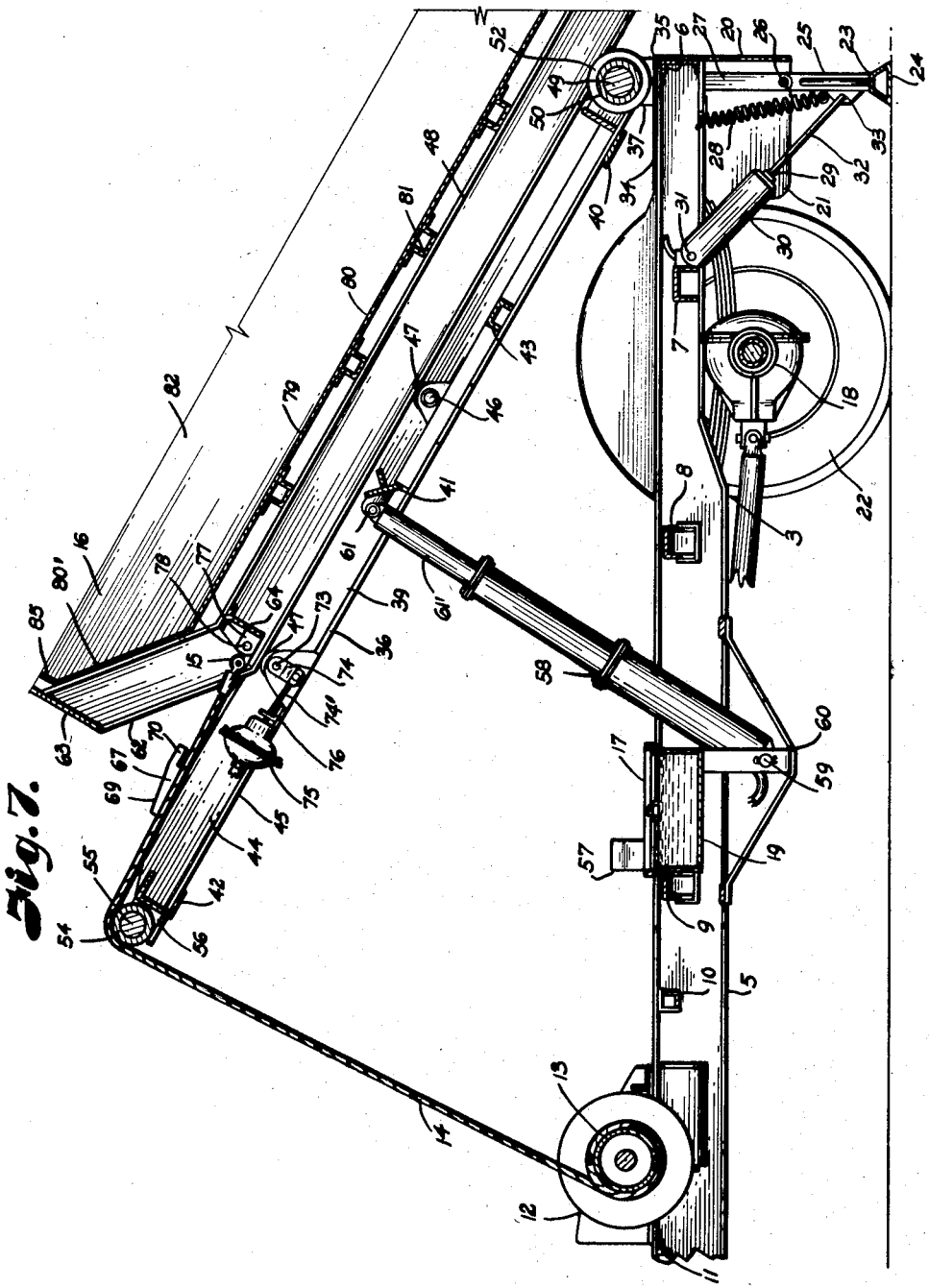
Fig. 7 is a partial longitudinal sectional view through the chassis tilting frame and body with said frame and body in tilted position for unloading the body therefrom.

In operating load-carrying equipment such as shown and described, and assuming the body 16 has been placed at a loading site with the upper doors 96 open whereby material, such as trash and the like, may be placed therein for loading the body, when it is desired to move the loaded body the truck with the lifting frame thereon is driven to the site and backed to position the rear end of the chassis adjacent the forward end of the body 16. The doors 96 are then closed and latched. The power winch is then operated and the cable 14 pulled therefrom over the roller 54 and between the guide flanges 52 and 53, and the hook 15 engaged with the pin 78 on the skids of the body. The winch 12 is operated to wind the cable 14 on the drum 13 whereby the plate or guard 63 on the forward end of the body is pulled into engagement with the butt plate 20 and then further pulling on the cable will raise the forward end of the body until the skids ride over the rollers 50 between the flanges 51. The skids of the body, being guided by the flanges 51, will be properly aligned to move forwardly between the flanges 44 of the tilting frame members 38 and 39 and roll on the rollers 47 while being pulled forwardly by the winch. The forward movement is continued until the forward motion of the body is stopped by engagement of the lugs 65 and 66 with the stop members 67 and 68, the forward lugs 65 riding over the latch arm 71 during the forward movement and then said latches automatically swing upwardly to lock the body on the tilting frame due to the pressure on the actuators 75. The hook is left attached to the pin 78 to aid in holding the body in place. The truck is driven to an area where the material is to be dumped from the body. The cable 124 is then placed around the pulley 133 and the latches 110 holding the door 104 in closed position are released and the hydraulic controls operated to actuate the extensible members 29 to swing the stiff legs 23 downwardly to aid in supporting the rear of the chassis as illustrated in Fig. 7. Then the hydraulic controls are operated to apply fluid pressure to the extensible members 58 and the winch drum is rotated whereby the cable 14 may be pulled therefrom whereby the extensible members swing the tilting frame and body upwardly toward dumping position. During the first upward swinging movement of the tilting frame, the pulley 133 applies a pull on the cable 124 to swing the arm through the stop 134 to a position substantially at right angles to the door. Then further lifting movement of the tilting frame causes the stop 135 to swing the door 104 to open position as illustrated in Fig. 4, the material in the body being dumped therefrom. The hydraulic controls are then operated to release the fluid pressure in the extensible member 29 whereby the spring 28 swings the stiff leg 23 upwardly and then the truck is driven forwardly from the dumped material. The hydraulic controls are then operated to release the pressure on the extensible members 58 whereby gravity together with the winch 12 and cable 14 are used to pull the lifting frame and body downwardly onto the truck chassis into load-carrying position. During the downward swinging movement of the lifting frame, the winch 12 is operated to rewind the cable 14 thereon, and if the vehicle is on an incline wherein the gravity does not effect the downward swinging movement of the lifting frame and body, the cable 14 will apply sufficient pull thereto to effect such downward swinging movement. After it has reached the load-carrying position as shown in Fig. 1, the hydraulic controls are moved to prevent flow of fluid pressure to the extensible members 58. The latches 110 are fastened to secure the door 104 in closed position. The truck is then driven to the site where the body is to be loaded and the cable 114 released from the pulley 133 and the actuators 75 operated to release the latches 71 and the hydraulic controls are operated to apply fluid pressure to the extensible members 58 and again tilt the tilting frame swinging same upwardly whereby gravity will cause the body to slide rearwardly off of the tilting frame as illustrated in Fig. 2 until the roller 101 engages the ground. The truck is then driven forwardly to move from under the body and the winch controlled whereby the body moves over the rear end of the tilting frame and is lowered to the ground. The hook is then disengaged and the cable 14 rewound on the winch drum and the tilting frame lowered onto the chassis.

It will be readily apparent that the same loading, unloading and dumping operations may be performed with the body 16 comprising different combinations of the sections shown and described and that the body member may be loaded and unloaded in both empty and full conditions and that the tilting frame may be utilized in various angle positions with the winch to provide other manipulations with the body or load container that may be positioned on skids adapted to be moved on a tilting frame to provide a flexibility of operation of the equipment and substantially continuous use of the truck and its chassis without its being tied up for long periods during loading and unloading of material from the body.

It is to be understood that while I have illustrated and described one form of my invention, it is not to be limited to the specific form or arrangement of parts herein described and shown except insofar as such limitations are included in the claims.

I claim:

1. In a load-carrying apparatus having a wheel supported chassis with an elongated frame having the rearward portion thereof pivotally mounted adjacent the rear end of the chassis for vertical swinging movement relative thereto with means for raising and lowering said elongated frame, a load-carrying body having a bottom, side and front end wall with an open rear end, means securing the body on the elongated frame, a door for closing the rear opening of the body, means pivotally mounting the door on the body at the upper end of the rear opening thereof for swinging movement for opening and closing said rear opening, an arm hinged on the door adjacent the pivotal mounting thereof for vertical swinging movement relative thereto, an elongated flexible member movably engaging the arm and door in spaced relation to the pivotal mountings thereof, resilient means connecting one end of the flexible member to the door, means on the chassis and spaced from the pivotal mounting of the elongated frame engaging the flexible member adjacent the other end thereof whereby raising movement of the elongated frame and body thereon moves the flexible member relative to the closed position of the door and arm, and spaced stop means on the flexible member for engaging the arm and door to effect relative swinging movement thereof and raising movement of the door in response to upward swinging movement of the elongated frame and body thereon.

2. In a load-carrying apparatus having a wheel supported chassis with an elongated frame having the rearward portion thereof pivotally mounted adjacent the rear end of the chassis for vertical swinging movement relative thereto with means for raising and lowering said elongated frame, a load-carrying body having a bottom, side, top and front end wall with an open rear end, means securing the body on the elongated frame, a door for closing the rear opening of the body, means pivotally mounting the door on the body at the upper end of the rear opening thereof for swinging movement for opening and closing said rear opening, an arm hinged on the door adjacent the pivotal mounting thereof for vertical swinging movement relative thereto, said arm having an aperture therein spaced from the pivotal mounting thereof, said door having an aperture therein aligned with the aperture in the arm when the door and arm are in closing position relative to the rear opening of the body, an elongated flexible member extending through the apertures in the door and arm, resilient means on the inside of the door connecting one end of the flexible member to the door, means on the chassis and spaced from the pivotal mounting of the elongated frame engaging the flexible member adjacent the other end thereof whereby raising movement of the elongated frame and body thereon moves the flexible member relative to the closed position of the door and arm, and spaced stop means on the flexible member for engaging the arm and door respectively to effect relative swinging movement thereof and raising movement of the door in response to upward swinging movement of the elongated frame and body thereon.

3. In a load-carrying apparatus having a wheel supported chassis with an elongated frame having the rearward end portion thereof pivoted on the rearward end portion of the chassis for vertical swinging movement of the frame relative to the chassis with spaced longitudinal tracks on said frame, and means for raising and lowering said frame relative to the chassis, a load-carrying body having a bottom, side, top and end walls and an unloading opening in the rearward end wall, skids on the bottom of the body adapted to be guided by the longitudinal tracks on the elongated frame, means for loading the body onto the elongated frame, means securing the body on the elongated frame, a door for closing the rear opening of the body, means pivotally mounting the door on the body at the upper end of the rear opening thereof, an arm hinged on the door adjacent the pivotal mounting thereof for vertical swinging movement relative thereto, an elongated flexible member movably engaging the arm and door in spaced relation to the pivotal mountings therof, resilient means connecting one end of the flexible member to the door, means on the chassis and spaced from the pivotal mounting of the elongated frame engaging the flexible member adjacent the other end thereof whereby raising movement of the elongated frame and body thereon moves the flexible member relative to the closed position of the door and arm, and spaced stop means on the flexible member for engaging the arm and door respectively to effect relative swinging movement thereof and raising movement of the door in response to upward swinging movement of the elongated frame and body thereon.

4. In a load-carrying apparatus having a wheel supported chassis with an elongated frame having the rearward end portion thereof pivoted on the rearward end portion of the chassis for vertical swinging movement of the frame relative to the chassis with spaced longitudinal tracks on said frame, and means for raising and lowering said frame relative to the chassis, a load-carrying body having a bottom, side, top and end walls and an unloading opening in the rearward end wall, skids on the bottom of the body adapted to be guided by the longitudinal tracks on the elongated frame, means for loading the body onto the elongated frame, means securing the body on the elongated frame, a door for closing the rear opening of the body, means pivotally mounting the door on the body at the upper end of the rear opening thereof, an arm hinged on the door adjacent the pivotal mounting thereof for vertical swinging movement relative thereto, said arm having an aperture therein spaced from the pivotal mounting thereof, said door having an aperture therein aligned with the aperture in the arm when in closing position, an elongated flexible member extending through the apertures in the door and arm, resilient means on the inside of the door connecting one end of the flexible member to the door, means on the chassis and spaced from the pivotal mounting of the elongated frame engaging the flexible member adjacent the other end thereof whereby raising movement of the elongated frame and body thereon moves the flexible member relative to the closed position of the door and arm, and spaced stop means on the flexible member for engaging the arm and door to effect relative swinging movement thereof and raising movement of the door in response to upward swinging movement of the elongated frame and body thereon.

5. A loading and unloading apparatus for vehicle bodies comprising, a wheel supported chassis including an elongated frame having a winch and cable adjacent the forward end thereof, a second elongated frame having a pair of track forming sides, means pivotally mounting the rearward portion of the second elongated frame on the rearward end of the elongated frame of the chassis for vertical swinging movement to and from overlying engagement therewith, extensible means pivotally connected with said chassis frame and said second frame for effecting raising and lowering movement of said second frame, oppositely disposed rollers spaced along the second elongated frame and journalled in the respective track forming sides of said frame to cooperate therewith in defining the tracks on said second elongated frame, a pair of body-supporting skids adapted to be guided by the track forming portions of the second frame, a cable connecting means adjacent the forward end of said skids, an elongate roller extending across and journalled at the forward end of the second frame for guiding the cable when the second frame is raised, a shaft mounted in fixed position between the rearward ends of the track forming sides of the second frame, a second elongate roller journalled on and extending across the shaft with the top of said second roller arranged to define with the rollers in the tracks a common plane supporting the skids within said second frame, and a butt plate extending across the rear end of the chassis frame and depending therefrom in substantially vertical alignment with the rearward side of said second roller.

6. A loading and unloading apparatus for vehicle bodies comprising, a wheel supported chassis including an elongated frame having a winch and cable adjacent the forward end thereof, a second elongated frame having a pair of track forming sides, means pivotally mounting the rearward portion of the second elongated frame on the rearward end of the elongated frame of the chassis for vertical swinging movement to and from overlying engagement therewith, extensible means pivotally connected with said chassis frame and said second frame for effecting raising and lowering movement of said second frame, oppositely disposed rollers spaced along the second elongated frame and journalled in the respective track forming sides of said frame to cooperate therewith in defining the tracks on the second elongated frame, a pair of body-supporting skids adapted to be guided by the track forming portions of the second frame, a cable connecting means adjacent the forward end of said skids, an elongate roller extending across and journalled at the forward end of the second frame for guiding the cable when the second frame is raised, a shaft mounted in fixed position between the rearward ends of the track forming sides of the second frame, a second elongate roller journalled on and extending across the shaft with the top of said second roller arranged to define with the rollers in the tracks a common plane supporting the skids within said second frame, a butt plate extending across the rear end of the chassis frame and depending therefrom in substantially vertical alignment with the rearward side of said second roller, laterally extending lugs on the skids, stop means on the track forming sides of the second elongated frame for engaging said lugs to limit forward movement of the body skids relative to said second elongated frame, said stop means having portions engaging over the lugs to retain said skids in the track forming portions, means on the second elongated frame arranged to automatically move behind the lugs to prevent rearward movement of the body-supporting skids, and means connected with the arms and operable to swing same into lug-releasing position.

7. A loading and unloading apparatus for vehicle bodies comprising, a wheel supported chassis including an elongated frame having a winch and cable adjacent the forward end thereof, a second elongated frame having a pair of track forming sides, means pivotally mounting the rearward portion of the second elongated frame on the rearward end of the elongated frame of the chassis for vertical swinging movement to and from overlying engagement therewith, extensible means pivotally connected with said chassis frame and said second frame for effecting raising and lowering movement of said second frame, oppositely disposed rollers spaced along the second elongated frame and journalled in the respective track forming sides of said frame to cooperate therewith in defining the tracks on the second elongated frame, a pair of body-supporting skids adapted to be guided by the track forming portions of the second frame, a cable connecting means adjacent the forward end of said skids, means at the forward end of the second frame for guiding the cable when the second frame is raised, a roller journalled on and extending between the rearward ends of the track forming sides of the second frame with the top of said second roller arranged to define with the tracks a common plane supporting the skids within said second frame, a butt plate extending across the rear end of the chassis frame and depending therefrom in substantially vertical alignment with the rearward side of said second roller, laterally extending lugs on the skids, stop means on the track forming sides of the second elongated frame for engaging said lugs to limit forward movement of the body skids relative to said second elongated frame, said stop means having portions engaging over the lugs to retain said skids in the track forming portions, arms pivotally mounted on the second elongated frame arranged to automatically move behind the lugs to prevent rearward movement of the body-supporting skids, means connected with the arms and operable to swing same into lug-releasing position, a body secured on the skids and having a bottom, side, top and front end wall with an open rear end, a door for closing the rear opening of the body, means pivotally mounting the door on the body at the upper end of the rear opening thereof, an elongated flexible member engaging the door in spaced relation to the pivotal mountings thereof, and means on the chassis and spaced from the pivotal mounting of the elongated frame engaging the flexible member adjacent the other end thereof whereby raising movement of the elongated frame and body thereon moves the flexible member relative to the closed position of the door to effect raising movement of the door in response to upward swinging movement of the elongated frame and body thereon.

8. A loading and unloading apparatus for vehicle bodies comprising, a wheel supported chassis including an elongated frame having a winch and cable adjacent the forward end thereof, a second elongated frame having a pair of track forming sides, means pivotally mounting the rearward portion of the second elongated frame on the rearward end of the elongated frame of the chassis for vertical swinging movement to and from overlying engagement therewith, extensible means pivotally connected with said chassis frame and said second frame for effecting raising and lowering movement of said second frame, oppositely disposed rollers spaced along the second elongated frame and journalled in the respective track forming sides of said frame to cooperate therewith in defining the tracks on the second elongated frame, a pair of body-supporting skids adapted to be guided by the track forming portions of the second frame, a cable connecting means adjacent the forward end of said skids, an elongate roller extending across and journalled at the forward end of the second frame for guiding the cable when the second frame is raised, a shaft mounted in fixed position between the rearward ends of the track forming sides of the second frame, a second elongate roller journalled on and extending across the shaft with the top of said second roller arranged to define with the tracks a common plane supporting the skids within said second frame, a butt plate extending across the rear end of the chassis frame and depending therefrom in substantially vertical alignment with the rearward side of said second roller, laterally extending lugs on the skids, stop means on the track forming sides of the second elongated frame for engaging said lugs to limit forward movement of the body skids relative to said second elongated frame, said stop means having portions engaging over the lugs to retain said skids in the track forming portions, arms pivotally mounted on the second elongated frame arranged to automatically move behind the lugs to prevent rearward movement of the body-supporting skids, means connected with the arms and operable to swing same into lug-releasing position, a body secured on the skids and having a bottom, side, top and front end wall with an open rear end, a door for closing the rear opening of the body, means pivotally mounting the door on the body at the upper end of the rear opening thereof, an arm hinged on the door adjacent the pivotal mounting thereof for vertical swinging movement relative thereto, an elongated flexible member movably engaging the arm and door in spaced relation to the pivotal mountings thereof, resilient means connecting one end of the flexible member to the door, means on the chassis and spaced from the pivotal mounting of the elongated frame engaging the flexible member adjacent the other end thereof whereby raising movement of the elongated frame and body thereon moves the flexible member relative to the closed position of the door and arm, and spaced stop means on the flexible member for engaging the arm and door to effect relative swinging movement thereof and raising movement of the door in response to upward swinging movement of the elongated frame and body thereon.

9. A loading and unloading apparatus for vehicle bodies comprising, a wheel supported chassis including an elongated frame, means including a cable on the wheel supported chassis and operable to take up and pay out said cable, a second elongated frame having a pair of track forming sides, means pivotally mounting the rearward portion of the second elongated frame on the rearward end of the elongated frame of the chassis for vertical swinging movement to and from overlying engagement therewith, extensible means pivotally connected with said chassis frame and said second frame for effecting raising and lowering movement of said second frame, oppositely disposed rollers spaced along the second elongated frame and journalled in the respective track forming sides of said frame to cooperate therewith in defining the tracks on the second elongated frame, a pair of body-supporting skids adapted to be guided by the track forming portions of the second frame, a cable connecting means adjacent the forward end of said skids, means at the forward end of the second frame for guiding the cable when the second frame is raised, a roller journalled on and extending between the rearward ends of the track forming sides of the second frame with the top of said second roller arranged to define with the tracks a common plane supporting the skids within said second frame, laterally extending lugs on the skids, stop means on the track forming sides of the second elongated frame for engaging said lugs to limit forward movement of the body skids relative to said second elongated frame, said stop means having portions engaging over the lugs to retain said skids in the track forming portions, arm pivotally mounted on the second elongated frame arranged to automatically move behind the lugs to prevent rearward movement of the body-supporting skids, means connected with the arms and operable to swing same into lug-releasing position, a body secured on the skids and having a bottom, side, top and front end wall with an open rear end, a door for closing the rear opening of the body, means pivotally mounting the door on the body at the upper end of the rear opening thereof, an elongated flexible member engaging the door in spaced relation to the pivotal mountings thereof, and means on the chassis and spaced from the pivotal mounting of the elongated frame engaging the flexible member adjacent the other end thereof whereby raising movement of the elongated frame and body thereon moves the flexible member relative to the closed position of the door to effect raising movement of the door in response to upward swinging movement of the elongated frame and body thereon.

References Cited in the file of this patent

UNITED STATES PATENTS

| | | |
|---|---|---|
| 2,316,826 | Wachter | Apr. 20, 1943 |
| 2,508,740 | Alvare | May 23, 1950 |
| 2,534,156 | Wyatt et al. | Dec. 12, 1950 |
| 2,580,501 | Anderson et al. | Jan. 1, 1952 |
| 2,588,001 | Holland | Mar. 4, 1952 |
| 2,613,827 | Van Doorne | Oct. 14, 1952 |
| 2,621,819 | Terho et al. | Dec. 16, 1952 |

FOREIGN PATENTS

| | | |
|---|---|---|
| 442,610 | Great Britain | Feb. 12, 1936 |
| 1,090,855 | France | Oct. 20, 1954 |